United States Patent
Kameyama

(10) Patent No.: US 8,872,456 B2
(45) Date of Patent: Oct. 28, 2014

(54) MOTOR CONTROL DEVICE

(75) Inventor: Hiroyuki Kameyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 13/583,245

(22) PCT Filed: Mar. 9, 2011

(86) PCT No.: PCT/JP2011/055498
§ 371 (c)(1),
(2), (4) Date: Sep. 7, 2012

(87) PCT Pub. No.: WO2011/114962
PCT Pub. Date: Sep. 22, 2011

(65) Prior Publication Data
US 2013/0038258 A1 Feb. 14, 2013

(30) Foreign Application Priority Data
Mar. 19, 2010 (JP) ................................. 2010-064040

(51) Int. Cl.
*H02P 6/14* (2006.01)
*H02P 27/06* (2006.01)
*H02J 1/10* (2006.01)

(52) U.S. Cl.
CPC .. *H02P 27/06* (2013.01); *H02J 1/10* (2013.01)
USPC ............ 318/400.27; 318/400.01; 318/400.26; 318/700

(58) Field of Classification Search
USPC .................. 318/400.01, 400.26, 400.27, 700
See application file for complete search history.

(56) References Cited

U.S. PATENT DOCUMENTS

| 8,169,180 B2 * | 5/2012 | Hwang et al. ................. 318/812 |
| 2006/0208687 A1 | 9/2006 | Takeoka et al. |
| 2009/0160382 A1 * | 6/2009 | Hwang et al. ............ 318/400.26 |

FOREIGN PATENT DOCUMENTS

| CN | 1875540 A | 12/2006 |
| JP | 4-165990 A | 6/1992 |
| JP | 2002-51589 A | 2/2002 |
| JP | 2005-198377 A | 7/2005 |
| JP | 2006-115667 A | 4/2006 |
| JP | 2010-288331 A | 12/2010 |

OTHER PUBLICATIONS

International Search Report issued in PCT/JP2011/055498, mailed on Jun. 14, 2011.

* cited by examiner

*Primary Examiner* — Kawing Chan
(74) *Attorney, Agent, or Firm* — Birch, Stewart, Kolasch & Birch, LLP

(57) ABSTRACT

A power supplied by an AC power supply is used as an input to a rectifying circuit, and an output of the rectifying circuit is used as an input to a smoothing capacitor having a capacitance of about 1/100 of the capacitance of conventionally used capacitance. The capacitor is provided between a positive electrode node and a negative electrode node located between bus lines of output of rectifying circuit. Diodes constituting a rectifying circuit are connected respectively with phase outputs of an inverter. The rectifying circuit is connected to the negative electrode node through a capacitor. The rectifying circuit is connected such that an electric current flows only in the direction from an output of the inverter to the capacitor. The load is connected in parallel with capacitor.

7 Claims, 5 Drawing Sheets

MOTOR CONTROL DEVICE

This application is the National Phase of PCT/JP2011/055498 filed on Mar. 9, 2011, which claims priority under 35 U.S.C. 119(a) to Patent Application No. JP 2010-064040 filed in Japan on Mar. 19, 2010. All of which are hereby expressly incorporated by reference into the present application.

BACKGROUND OF THE INVENTION

1. Technical Field

The present invention relates to a control device for motor driving, for example, a motor control device using a capacitor of small capacitance.

2. Description of Related Art

In recent years, efforts have been made to considerably reduce the capacitance of a smoothing capacitor to thereby downsize a motor control device.

For example, according to Japanese Patent Laying-Open No. 2002-51589, the capacitance of a smoothing capacitor is considerably reduced to intentionally cause a ripple of frequency twice that of the power supply to occur in a DC voltage, thereby achieving an improved input current waveform and a high power factor with a simple system.

Further, the capacity of a coil to be provided between an AC power supply and a rectifying circuit can be considerably reduced or eliminated.

On the other hand, reducing the capacitance of a smoothing capacitor causes the voltage to rise rapidly when the smoothing capacitor absorbs a large regenerative energy generated at a halt of a motor. The over-voltage may damage a switching device for an inverter in a motor control device.

Therefore, there has been proposed a system for protecting each driving device such as a switching device from a damage caused by the over-voltage of the regenerative energy generated in a motor even if the capacitance of a smoothing capacitor is reduced. For example, Japanese Patent Laying-Open No. 2005-198377 discloses such a system.

FIG. 5 is a block diagram showing a motor control device of the aforementioned publication.

As shown in FIG. 5, the motor control device has a connection using a power supplied by an AC power supply 1 as an input to a rectifying circuit 2 and using an output of rectifying circuit 2 as an input to a smoothing capacitor 3 of about 1/100 of the capacitance of a conventional smoothing capacitor. An inverter 4 includes six transistors (5u-5z) and diodes (6u-6z), connected in inverse relative to the transistors, in a three-phase bridge connection, and is connected in parallel with capacitor 3.

A motor 7 is connected using an output of inverter 4 as an input. A control circuit 8 drives the gates of transistors (5u-5z) of inverter 4. A power supply circuit 9 supplies electric power to control circuit 8.

A capacitor 10 is connected in parallel with smoothing capacitor 3 through a diode 11 serving as a rectifying circuit, and a load 12 is further connected in parallel with capacitor 10. Thus, since the regenerative energy of the motor is absorbed in capacitor 3 and capacitor 10, and energy is consumed in load 12 before the voltage exceeds a breakdown voltage, each driving device can be protected from being damaged.

CITATION LIST

Patent Literature

PTL 1: Japanese Patent Laying-Open No. 2002-51589
PTL 2: Japanese Patent Laying-Open No. 2005-198377

SUMMARY OF INVENTION

Technical Problem

However, to allow the regenerative energy generated in motor 7 to be absorbed in capacitor 3 and capacitor 10, the above-described configuration causes a time delay due to bringing diode 6u or/and diode 6v or/and diode 6w of inverter 4 into conduction and thereafter bringing diode 11 into conduction. There is a possibility of the voltage exceeding the breakdown voltage due to such a time delay Moreover, concerning the use of the regenerative energy in load 12, since the regenerative energy is absorbed in capacitor 10 through the two devices including the first diode, i.e. diode 6u or/and diode 6v or/and diode 6w of inverter 4, and the second diode, i.e. diode 11 serving as a rectifying circuit, the loss of energy by these two devices occurs. Thus, the energy that can be used in load 12 is reduced.

The present invention was made to solve the above-described problems, and its object is to provide a motor control device capable of effectively protecting each driving device from a damage caused by the over-voltage of the regenerative energy generated in a motor and effectively using the regenerative energy even if the capacitance of the smoothing capacitor is reduced.

Solution to Problem

A motor control device according to an aspect of the present invention includes a first rectifying circuit using a single-phase AC power supply as an input, a first capacitor connected to the first rectifying circuit and smoothing DC power obtained in the first rectifying circuit, an inverter connected in parallel with the first capacitor and converting DC power to AC power, a motor connected to an output side of the inverter, a control circuit controlling the inverter, and a regulator circuit absorbing regenerative energy of the motor. The regulator circuit includes a second rectifying circuit connected to the output side of the inverter, a second capacitor connected to the second rectifying circuit and absorbing the regenerative energy of the motor, and a load connected in parallel with the second capacitor.

A motor control device according to another aspect of the present invention includes a first rectifying circuit using a single-phase AC power supply as an input, a first capacitor connected to the first rectifying circuit and smoothing DC power obtained in the first rectifying circuit, an inverter connected in parallel with the first capacitor and converting DC power to AC power, a motor connected to an output side of the inverter, a control circuit controlling the inverter, and a power supply circuit supplying voltage to the control circuit. The power supply circuit includes a second rectifying circuit using the single-phase AC power supply as an input, a second capacitor connected to the second rectifying circuit and smoothing DC power obtained in the second rectifying circuit, and a voltage converter circuit connected in parallel with the second capacitor and converting DC high voltage to DC low voltage and then supplying the DC low voltage to the control circuit. The motor control device further includes a third rectifying circuit connecting the second capacitor and the output side of the inverter.

Preferably, the second capacitor has a larger capacitance than the first capacitor. Preferably, the regenerative energy of the motor is absorbed in the first capacitor and the second capacitor.

Particularly, the regenerative energy of the motor is used in the control circuit as a load.

Advantageous Effects of Invention

A motor control device according to an aspect of the present invention includes a regulator circuit absorbing a regenerative energy of a motor. A regulator circuit includes a second rectifying circuit connected to an output side of an inverter, a second capacitor connected to the second rectifying circuit and absorbing the regenerative energy of the motor, and a load connected in parallel with the second capacitor. Thus, since the motor control device is configured to absorb the regenerative energy in the capacitor and consume the regenerative energy in the load when the regenerative energy of the motor is generated, a damage to each driving device caused by the over-voltage of the regenerative energy can be prevented. Here, since the capacitor is connected to the output of the inverter through the rectifying circuit, absorption of energy at the time when the regenerative energy is generated can be started earlier, thus the rise in voltage can be suppressed earlier as compared to conventional technologies.

In other words, a damage to each driving device can be prevented more effectively. Further, since the regenerative energy is absorbed in the capacitor through a single rectifying circuit, the energy loss becomes smaller as compared to the case of using conventional technologies, thus the regenerative energy stored in the capacitor can be used more effectively.

DESCRIPTION OF EMBODIMENTS

Figure 1:
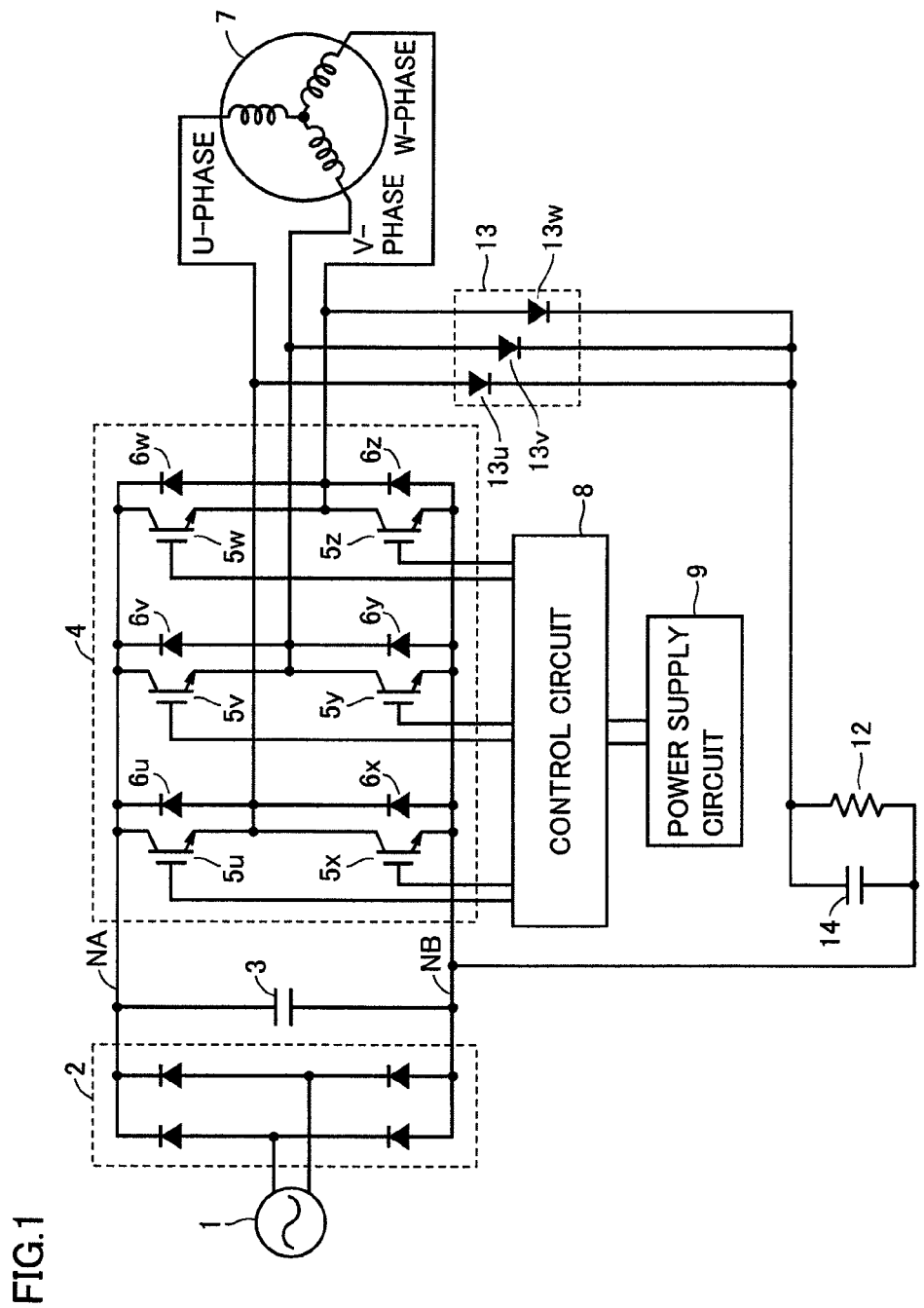
FIG. 1 is a block diagram showing a motor control device according to a first embodiment of the present invention.

Hereinafter, embodiments of the present invention will be described with reference to the drawings. In the following description, the same parts have the same reference characters allotted. They are named and function identically. Therefore, detailed description thereof will not be repeated.

(First Embodiment)

FIG. 1 is a block diagram showing a motor control device according to the first embodiment of the present invention.

With reference to FIG. 1, a motor control device according to the first embodiment of the present invention has a connection using a power supplied by an AC power supply 1 as an input to a rectifying circuit 2 and using an output of rectifying circuit 2 as an input to a smoothing capacitor 3 of about 1/100 of the capacitance of a conventional smoothing capacitor. Capacitor 3 is provided between a positive electrode node NA and a negative electrode node NB located between bus lines of output of rectifying circuit 2.

An inverter 4 includes six transistors ($5u$-$5z$) and diodes ($6u$-$6z$), connected in inverse relative to the transistors, in a three-phase bridge connection, and is connected in parallel with capacitor 3.

Further, a motor 7 is connected using an output of inverter 4 as an input. A control circuit 8 drives gates of transistors ($5u$-$5z$) of inverter 4. A power supply circuit 9 supplies a power to control circuit 8.

In the motor control device according to Embodiment 1 of the present invention, a regulator circuit for absorbing the regenerative energy of motor 7 is provided.

Specifically, the regulator circuit includes a rectifying circuit 13, a capacitor 14, and a load 12.

Rectifying circuit 13 includes diodes $13u$, $13v$, and $13w$. Diodes $13u$, $13v$, and $13w$ are connected respectively to phase outputs of inverter 4.

Diodes $13u$, $13v$, and $13w$ constituting rectifying circuit 13 are connected to negative electrode node NB through capacitor 14. Rectifying circuit 13 is connected such that an electric current flows only in the direction from the output of inverter 4 (an input of motor 7) to capacitor 14.

Further, load 12 is connected in parallel with capacitor 14. Herein, one example of the load is a resistor.

Herein, the regenerative energy generated in motor 7 is absorbed in smoothing capacitor 3 having a small capacitance and capacitor 14. The energy stored in capacitor 14 is consumed in load 12 connected in parallel with capacitor 14.

Power supply circuit 9 supplies power to control circuit 8 controlling inverter 4.

Hereinafter, operation of the motor control device according to the first embodiment configured as described above will be described.

Figure 2:
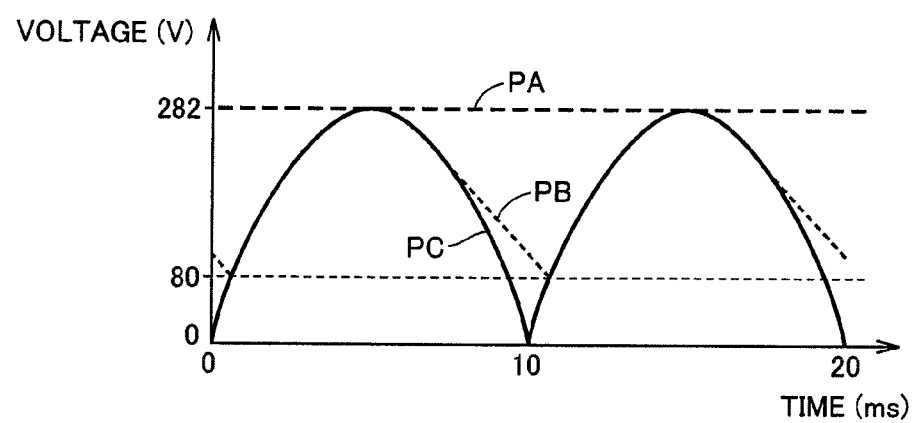
FIG. 2 is a drawing to describe a voltage waveform in a capacitor 3 of the motor control device according to the first embodiment of the present invention.

FIG. 2 is a drawing to describe a voltage waveform in capacitor 3 of the motor control device according to Embodiment 1 of the present invention.

First, it is assumed that only very little energy is consumed in motor 7. If AC power supply 1 is single-phase 200V and has a frequency of 50 Hz, the voltage at opposite ends of capacitor 3 is smoothed to be 282V as indicated by a voltage waveform PA in FIG. 2.

Next, as the energy consumed in motor 7 is brought to be slightly greater, charged electric load of capacitor 3 is used, so that the instantaneous minimum voltage is lowered as indicated by a voltage waveform PB. However, the instantaneous maximum voltage determined by the voltage of AC power supply 1 is unchanged and maintains 282V.

Further, as the energy consumed in motor 7 is brought to be greater, almost no charge is stored in capacitor 3, so that the instantaneous minimum voltage is lowered to almost 0V as indicated by a voltage waveform PC. However, the instantaneous maximum voltage determined by the voltage of AC power supply 1 is unchanged and maintains 282V.

As described above, if capacitor 3 has a small capacitance, a load current taken out is not smoothed substantially, and a waveform formed by applying a full-wave rectification to an input of AC power supply 1 can be obtained. Since a voltage ripple and a current ripple of capacitor 3 become large, a film capacitor is preferably used.

On the other hand, since capacitor 14 is connected in parallel with inverter 4 through rectifying circuit 13, and the energy of capacitor 14 is consumed only in load 12. Thus, even if the energy consumption in the motor 7 becomes large, the voltage to be applied to opposite ends is substantially smoothed.

Figure 3:
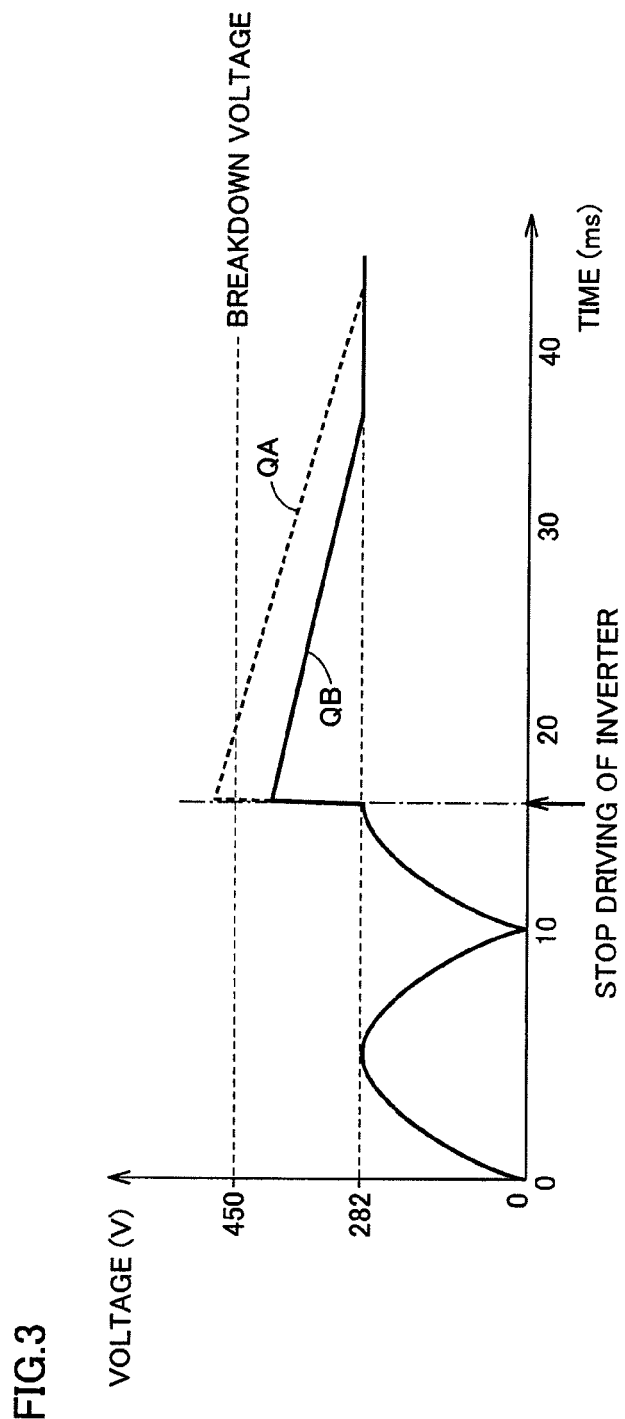
FIG. 3 is a drawing to describe characteristics of voltage values on opposite ends of a capacitor 3 according to the first embodiment of the present invention.

Next, the case will be described where a large regenerative energy is generated. FIG. 3 is a diagram explaining characteristics of voltage values on opposite ends of capacitor 3 according to the first embodiment of the present invention.

With reference to FIG. 3, now herein, if transistors $5u$-$5z$ of inverter 4 are all turned off at the timing when the driving of the inverter is halted in FIG. 3, the energy stored in the winding in motor 7 is regenerated in inverter 4.

Figure 5:
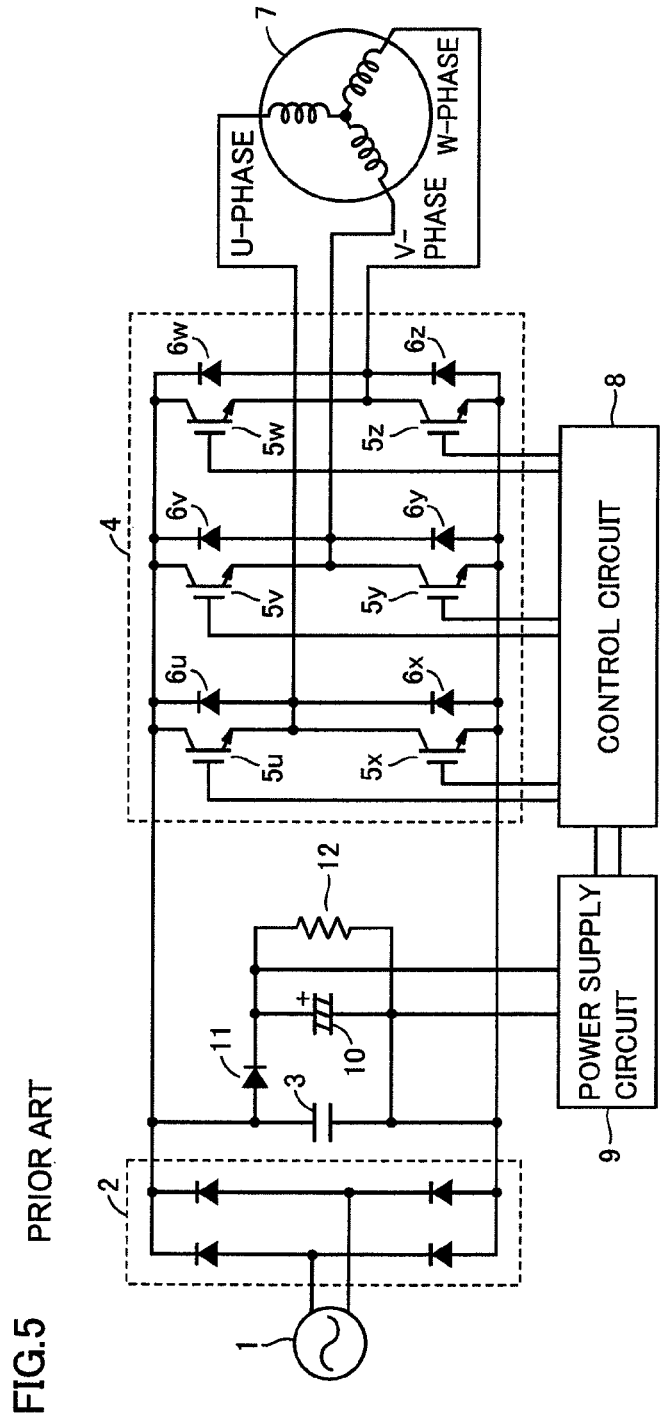
FIG. 5 is a block diagram of a conventional motor control device.

If diode 6u or/and diode 6v or/and diode 6w in inverter 4 is brought into conduction, and thereafter diode 11 is brought into conduction like the conventional motor control device shown in FIG. 5, a time delay in arrival of the regenerative energy to capacitor 3 and capacitor 10 becomes greater, thereby causing a delay in suppression of rise in the voltage as indicated by a conventional voltage waveform QA in FIG. 3.

Herein, assuming that the breakdown voltage of inverter 4 used is 450V, the voltage exceeds the breakdown voltage of 450V to become an over-voltage. Thus, each driving device of the inverter may be damaged by the effect of the over-voltage.

On the other hand, the motor control device according to the first embodiment of the present invention is configured to include a regulator circuit absorbing the regenerative energy of the motor. Specifically, capacitor 14 is connected to an output of inverter 4 through rectifying circuit 13, thus a time delay of the regenerative energy is small. Further, since the energy stored in capacitor 14 is consumed in load 12, the rise in voltage can be suppressed earlier as compared to the conventional motor control device, and the rise in voltage caused by the regenerative energy becomes equal to or smaller than the breakdown voltage, as indicated by voltage waveform QB in FIG. 3. In other words, while the diodes of the conventional motor control device are in two-stage series connection, the diodes of the motor control device according to the first embodiment of the present invention has a one-stage configuration, thus a time delay becomes small.

Further, in the conventional motor control device shown in FIG. 5, if the regenerative energy absorbed in the capacitor 10 is used in the load, an electric current flows to both of the first diode, i.e. the diode 6u or/and diode 6v or/and diode 6w of inverter 4, and the second diode, i.e. rectifying circuit 11. Thus, loss of energy occurs in the two-stages of diodes, thereby reducing energy that can be used in the load.

In the motor control device according to the first embodiment of the present invention, the regenerative energy is absorbed in capacitor 14 only through the first diode of rectifying circuit 13 without passing through diode 6u or/and diode 6v or/and 6w of inverter 4, thus the energy loss becomes smaller than the conventional case. Therefore, the regenerative energy stored in capacitor 14 can be used in load 12 more effectively.

Herein, since almost no ripple occurs in capacitor 14, there is no need to take in consideration a damage caused by a heat generated by a ripple, and an inexpensive electrolytic capacitor can be used. Thus, a small and inexpensive motor control device can be obtained capable of preventing a damage to each driving device caused by the over-voltage of regenerative energy.

Further, as capacitor 3, a capacitor is used having a capacitance sufficiently small (for example, 10 µF) to intentionally cause a ripple of a frequency twice that of the power supply to occur in the direct voltage, thereby achieving an improved input current waveform and a higher power factor. As capacitor 14, a capacitor is used having a capacitance larger than capacitor 3 (for example, 50 µF), thereby achieving suppression of rise in voltage caused by the regenerative energy.

Further, the energy stored in capacitor 3 is maintained while driving of inverter 4 is halted, but is consumed when driving of inverter 4 is restarted. Alternatively, if a load such as a resistor (not shown) is connected in parallel with capacitor 3, the energy is consumed in the load even when driving of inverter 4 is halted.

(Second Embodiment)

Figure 4:
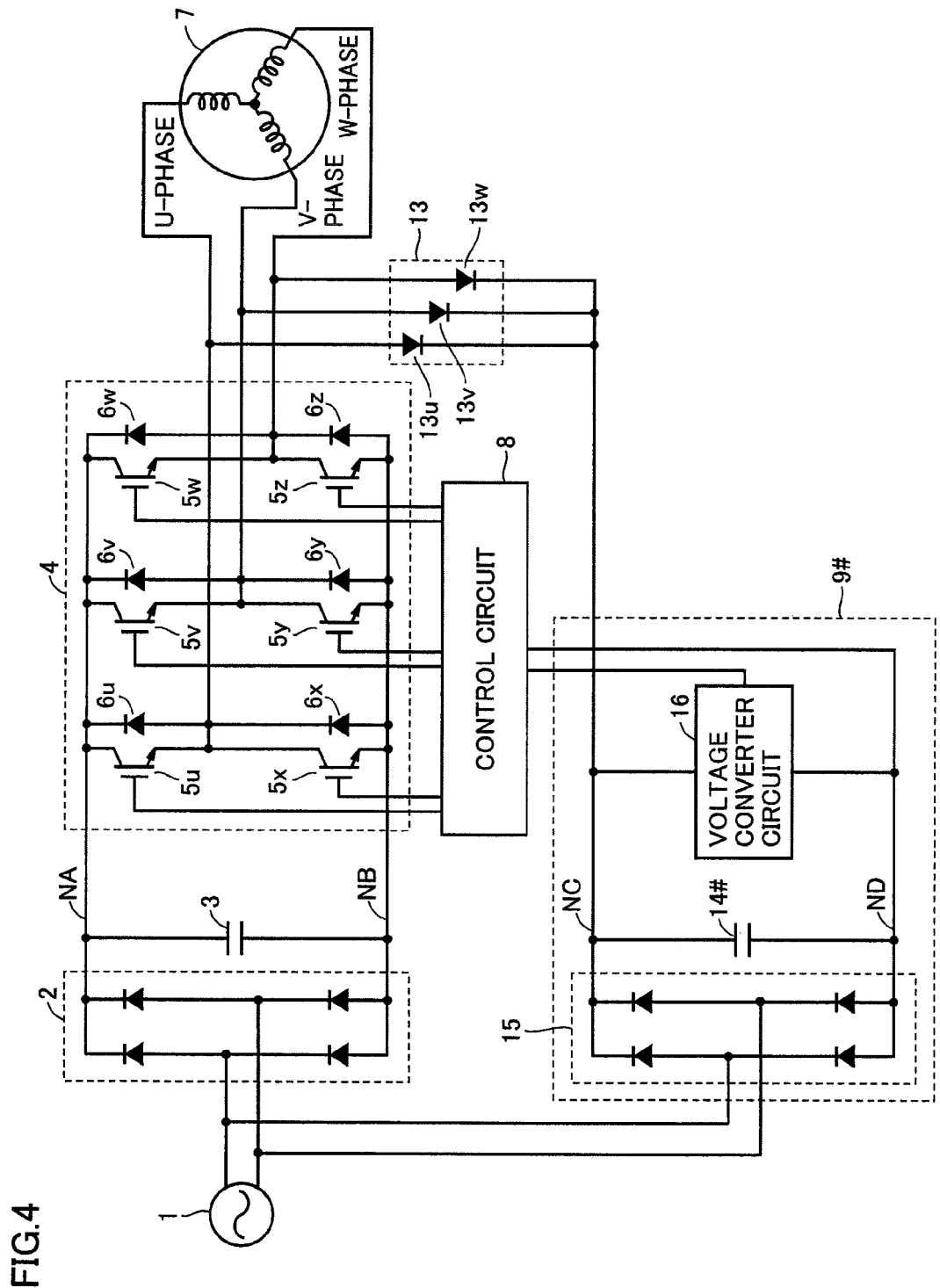
FIG. 4 is a block diagram of a motor control device according to a second embodiment of the present invention.

FIG. 4 is a block diagram showing a motor control device according to a second embodiment of the present invention.

With reference to FIG. 4, a motor control device according to the second embodiment of the present invention is different from the motor control device according to the first embodiment described above with reference to FIG. 1 in that capacitor 14 and load 12 are omitted, and the configuration of a power supply circuit 9# is also different.

Specifically, rectifying circuit 13 is connected to power supply circuit 9#. Other elements are substantially the same as those in the motor control device according to the first embodiment described above with reference to FIG. 1. Therefore, detailed description thereof will not be repeated.

As shown in FIG. 4, power supply circuit 9# includes a rectifying circuit 15 rectifying AC power of AC power supply 1 to DC power, a capacitor 14# connected in parallel with rectifying circuit 15, and a voltage converter circuit 16 connected in parallel with capacitor 14# and converting DC high voltage to DC low voltage. Voltage converter circuit 16 supplies necessary voltage to control circuit 8. Capacitor 14# is provided between a positive electrode node NC and a negative electrode node ND located between bus lines of output of rectifying circuit 15.

In the second embodiment of the present invention, capacitor 14# serving to smooth DC high voltage of power supply circuit 9# is used also as a capacitor absorbing the above-described regenerative energy.

Specifically, positive electrode node NC and rectifying circuit 13 are connected to each other.

Similarly to the configuration described in the Embodiment 1, the energy stored in the winding in motor 7 is absorbed as the regenerative energy in capacitor 3 and capacitor 14#.

Therefore, since the capacitor smoothing DC high voltage of power supply circuit 9# and the capacitor absorbing the regenerative energy can be used commonly in capacitor 14#, the number of components can be reduced, thereby achieving a small and inexpensive motor control device preventing a damage to each driving device caused by the over-voltage of regenerative energy.

Further, replacing load 12 with control circuit 8 of inverter 4 can reduce the number of components, and using the regenerative energy stored in capacitor 14# as energy for control circuit 8 enables efficient operation.

Moreover, as described above, in the conventional motor control device shown in FIG. 5, if the regenerative energy absorbed in capacitor 10 is used in the load, an electric current flows to both of the first diode. i.e. diode 6u or/and diode 6v or/and diode 6w of inverter 4, and the second diode, i.e. rectifying circuit 11. Thus, the loss of energy by these two devices occurs, thereby reducing the energy usable in the load 12.

In the motor control device according to the second embodiment of the present invention, the regenerative energy is absorbed in capacitor 14# only through the first diode of rectifying circuit 13 without passing through diode 6u or/and diode 6v or/and 6w of inverter 4. Thus, energy loss becomes smaller than the conventional case, thereby enabling the regenerative energy accumulated in capacitor 14# to be used as an energy for control circuit 8.

It should be understood that the embodiments and examples disclosed herein are illustrative and non-restrictive in every respect. The scope of the present invention is defined by the terms of claims, and is intended to include any modifications within the scope and meaning equivalent to the terms of the claims.

REFERENCE SIGNS LIST

1 AC power supply; 2, 11, 13, 15 rectifying circuit; 3, 10, 14, 14# capacitor; 4 inverter; 7 motor; 5u-5z transistor; 6u-6z, 13u, 13v, 13w diode; 8 control circuit; 9, 9# power supply circuit; 12 load; 16 voltage converter circuit.

The invention claimed is:
1. A motor control device, comprising:
a first rectifying circuit using a single-phase AC power supply as an input;
a first capacitor connected to said first rectifying circuit and smoothing DC power obtained in said first rectifying circuit,
an inverter connected in parallel with said first capacitor and converting DC power to AC power;
a motor connected to an output side of said inverter;
a control circuit controlling said inverter; and
a regulator circuit absorbing a regenerative energy of said motor,
said regulator circuit including
a second rectifying circuit connected to the output side of said inverter;
a second capacitor connected in series to said second rectifying circuit and absorbing the regenerative energy of said motor; and
a load connected in parallel with said second capacitor.
2. The motor control device according to claim 1, wherein said second capacitor has a larger capacitance than said first capacitor.
3. The motor control device according to claim 1, wherein the regenerative energy of said motor is absorbed in said first capacitor and said second capacitor.
4. A motor control device, comprising:
a first rectifying circuit using a single-phase AC power supply as an input;
a first capacitor connected to said first rectifying circuit and smoothing DC power obtained in said first rectifying circuit,
an inverter connected in parallel with said first capacitor and converting DC power to AC power;
a motor connected to an output side of said inverter;
a control circuit controlling said inverter; and
a power supply circuit supplying voltage to said control circuit,
said power supply circuit including
a second rectifying circuit using said single-phase AC power supply as an input,
a second capacitor connected to said second rectifying circuit and smoothing DC power obtained in said second rectifying circuit; and
a voltage converter circuit connected in parallel with said second capacitor and converting DC high voltage to DC low voltage and then supplying the DC low voltage to said control circuit, and
said motor control device further comprises a third rectifying circuit forming a series connection with said second capacitor at the output side of said inverter.
5. The motor control device according to claim 4, wherein the regenerative energy of said motor is used in said control circuit as a load.
6. The motor control device according to claim 4, wherein said second capacitor has a larger capacitance than said first capacitor.
7. The motor control device according to claim 4, wherein the regenerative energy of said motor is absorbed in said first capacitor and said second capacitor.

* * * * *